(12) United States Patent  (10) Patent No.: US 7,669,687 B2
Takahashi et al.  (45) Date of Patent: Mar. 2, 2010

(54) MUFFLER MOUNTING STRUCTURE

(75) Inventors: Shinji Takahashi, Wako (JP); Shinji Kawatani, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 618 days.

(21) Appl. No.: 11/226,342

(22) Filed: Sep. 15, 2005

(65) Prior Publication Data

US 2006/0065468 A1  Mar. 30, 2006

(30) Foreign Application Priority Data

Sep. 30, 2004 (JP) ............................. 2004-289272

(51) Int. Cl.
*B60K 13/04* (2006.01)
(52) U.S. Cl. ........................ 180/309; 180/296; 180/89.2
(58) Field of Classification Search ................. 180/309, 180/68.4, 89.2, 296
See application file for complete search history.

(56) References Cited

U.S. PATENT DOCUMENTS

| 4,343,374 | A | * | 8/1982 | Hollandsworth | ......... | 180/69.22 |
|---|---|---|---|---|---|---|
| 4,972,921 | A | * | 11/1990 | Takada et al. | ................ | 181/282 |
| 6,438,949 | B1 | * | 8/2002 | Nozaki | ......................... | 60/322 |
| 6,508,329 | B2 | * | 1/2003 | Maki et al. | ................... | 180/309 |
| 6,758,300 | B2 | * | 7/2004 | Kromis et al. | .............. | 180/309 |
| 2003/0085027 | A1 | * | 5/2003 | Koyama | ...................... | 165/140 |
| 2004/0089493 | A1 | * | 5/2004 | Chae | .......................... | 180/309 |

FOREIGN PATENT DOCUMENTS

| JP | 07026950 A | * | 1/1995 |
|---|---|---|---|
| JP | 2001-280127 | | 10/2001 |
| JP | 2004-108227 A | | 4/2004 |

* cited by examiner

*Primary Examiner*—Glenn Dayoan
*Assistant Examiner*—Katy Meyer
(74) *Attorney, Agent, or Firm*—Westerman, Hattori, Daniels & Adrian, LLP

(57) ABSTRACT

A vehicular muffler mounting structure in which a muffler is supported inside wheels by a body frame is provided. The muffler is connected to the body frame through a fastener that is screwed substantially parallel to the lengthwise direction of a body.

5 Claims, 5 Drawing Sheets

MUFFLER MOUNTING STRUCTURE

FIELD OF INVENTION

The present invention relates to a muffler mounting structure for a vehicle in which a muffler is supported inside the vehicle by a body frame.

BACKGROUND OF THE INVENTION

In general, a muffler-supporting portion of a body frame is attached to a muffler with a fastener such as a bolt passing through both the portions in a width direction of the vehicle. One example of such a structure is disclosed in Japanese Patent Laid-open No. 2001-280127. In this case, the fastener is screwed in the width direction of the vehicle.

In such a configuration wherein the muffler is supported inside the body frame wheels by the body frame, it is difficult to access the fastener from the width direction of the vehicle with a tool. This makes it more difficult to mount and dismount the muffler.

Accordingly, an object of the present invention is to provide a muffler mounting structure capable of mounting and dismounting a muffler with ease even if the muffler is supported by a body frame inside a vehicle body.

SUMMARY OF THE INVENTION

In one embodiment of the present invention, wherein a muffler 90 is supported inside wheels 3 by a body frame 4, the muffler is connected to the body frame through a fastener (e.g., the bolt 117 of the embodiment) that is attached substantially parallel to longitudinal (lengthwise) direction of the body frame.

Thus, it is possible to insert a tool from an area portion, rearward of the muffler. This area is usually open and thereby provides access to the fastener connecting the body frame and the muffler. In other words, the muffler can be attached and detached without the obstacle of the body frame and the wheels.

In another embodiment of the present invention, the muffler is provided with at least two attachment portions (e.g., the stays 106, 109) on an upper portion and a lower portion, respectively, of the muffler; at least one of the attachment portions is fastened to the body frame through the fastener; and at least the other one of the attachment portions is engaged with the body frame through a retaining portion (e.g., the retaining pin 108).

Also, the muffler can be attached or detached by only engaging or disengaging the attachment portion having the retaining portion with or from the body frame and by fastening or unfastening the fastener to or from only the other attachment portion. In addition, the muffler can be carried at its multiple positions by the body frame.

In this case, as the invention recited in claim 3, since the attachment portion connected to the body frame through the fastener is located on a rear portion of the muffler, when a tool is inserted from the rear portion of the muffler for work, it is easier for the tool to access the fastener. Thus the working circumstances can be enhanced.

Also, the attachment portion connected to the body frame through the fastener may be located at a single portion or location. Thus, fastening man-hours can be reduced.

Also the attachment portions are provided on respective circumferential portions of the muffler so as to correspond with barrier ribs (e.g., the barrier ribs 94, 95 of the embodiment), respectively, in the muffler. Therefore, it is possible to support the muffler at the respective portions reinforced with the barrier ribs.

BRIEF DESCRIPTION OF THE DRAWINGS

A preferred embodiment of the present invention will be described with reference to the accompanying drawings, wherein.

DETAILED DESCRIPTION OF THE INVENTION

Figure 1:
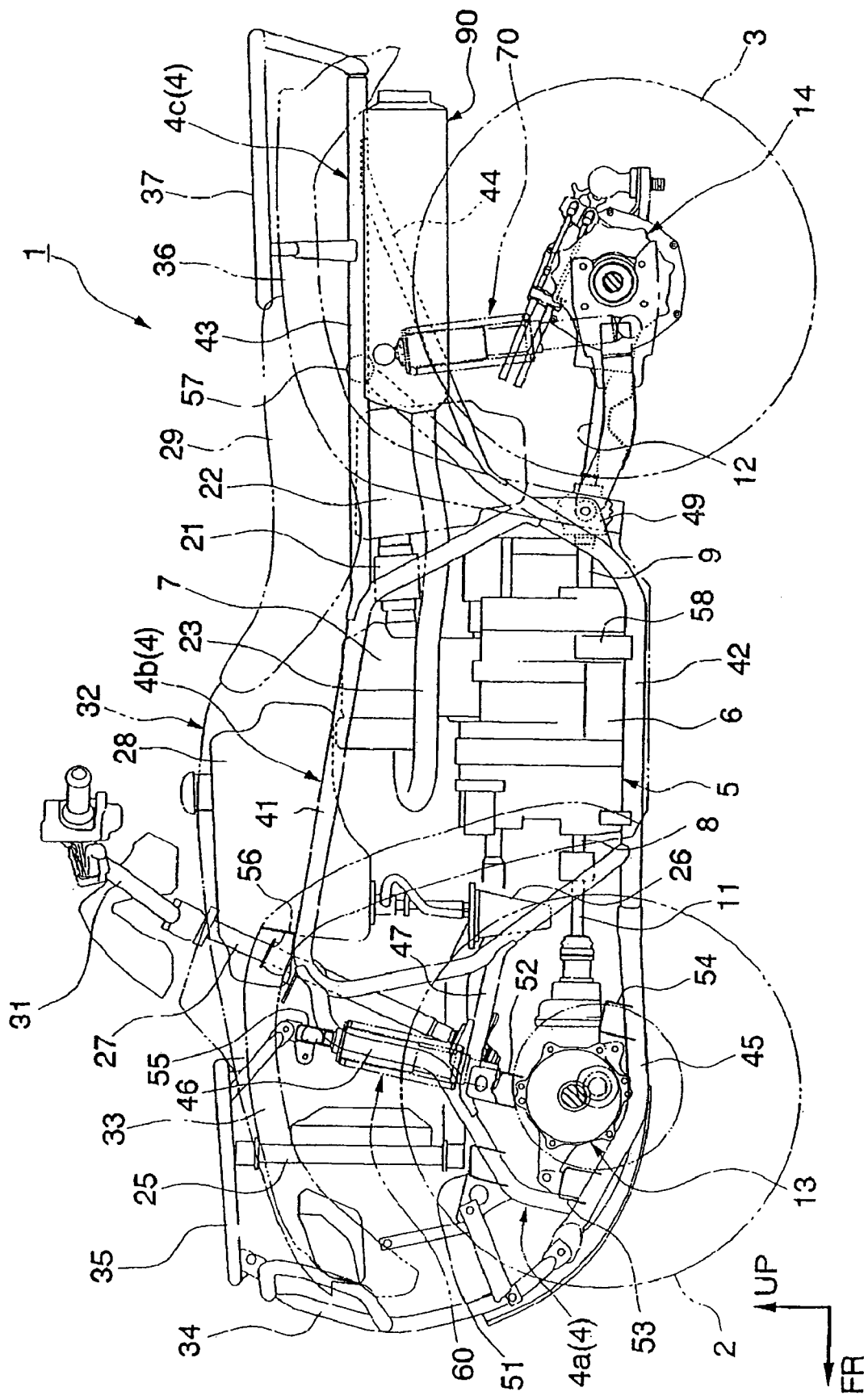
FIG. 1 is a side view of a four-wheeled buggy according to the present invention.

A preferred embodiment of the present invention will be described below with reference to the drawings. It is to be noted that the longitudinal and lateral directions in the following description are the same as those of the vehicle (body) unless otherwise designated. In the drawings, arrow FR denotes the front of the vehicle, arrow LH the left-hand thereof and arrow UP the upside thereof.

A four-wheeled buggy (vehicle) illustrated in FIG. 1 includes a body constructed in a compact size and at a reduced weight, and left and right front wheels 2 and rear wheels 3 located respectively at the front and rear portions of the body. The wheels 2, 3 have low-pressure balloon tires each having a relatively large diameter. With this construction, the buggy is the so-called ATV (All Terrain Vehicle), which provides a satisfactory lowest height and enhances drive ability on, particularly, a rough terrain. The front and rear wheels 2, 3 are suspended by a front portion 4a and a rear portion 4c of the body frame 4 by means of front suspensions 60 and rear suspensions 70, respectively.

An engine 5 as a prime mover for the buggy 1 is mounted on the center portion (i.e., the substantially middle portion of the body) 4b of the body frame 4. The engine 5 is a water-cooled single cylinder reciprocating engine, by way of example, which has the so-called longitudinal layout in which the rotary axis of a crankshaft is arranged to extend along the lengthwise direction of the vehicle. The engine 5 has a crankcase 6 and a cylinder unit 7 provided on the crankcase 6. A front output shaft 8 and a rear output shaft 9 extend along the lengthwise direction toward the front and the back from the front portion and rear portion of the crankcase 6, respectively, that is, from respective locations offset to the left side relative to the middle of the widthwise direction of the vehicle.

The front and rear output shafts 8, 9 are connected to the front wheels 2 and the rear wheels 3 through a front drive shaft 11 and a rear drive shaft 12, and a front final reduction gear unit 13 and a rear final reduction gear unit 14, respectively. In this way, the power of the engine 5 is transmitted through a transmission not shown housed in the crankcase 6, the output shafts 8 and 9, the drive shafts 11 and 12, and the final reduction gear units 13 and 14, to the front and rear wheels 2 and 3, respectively.

Figure 2:
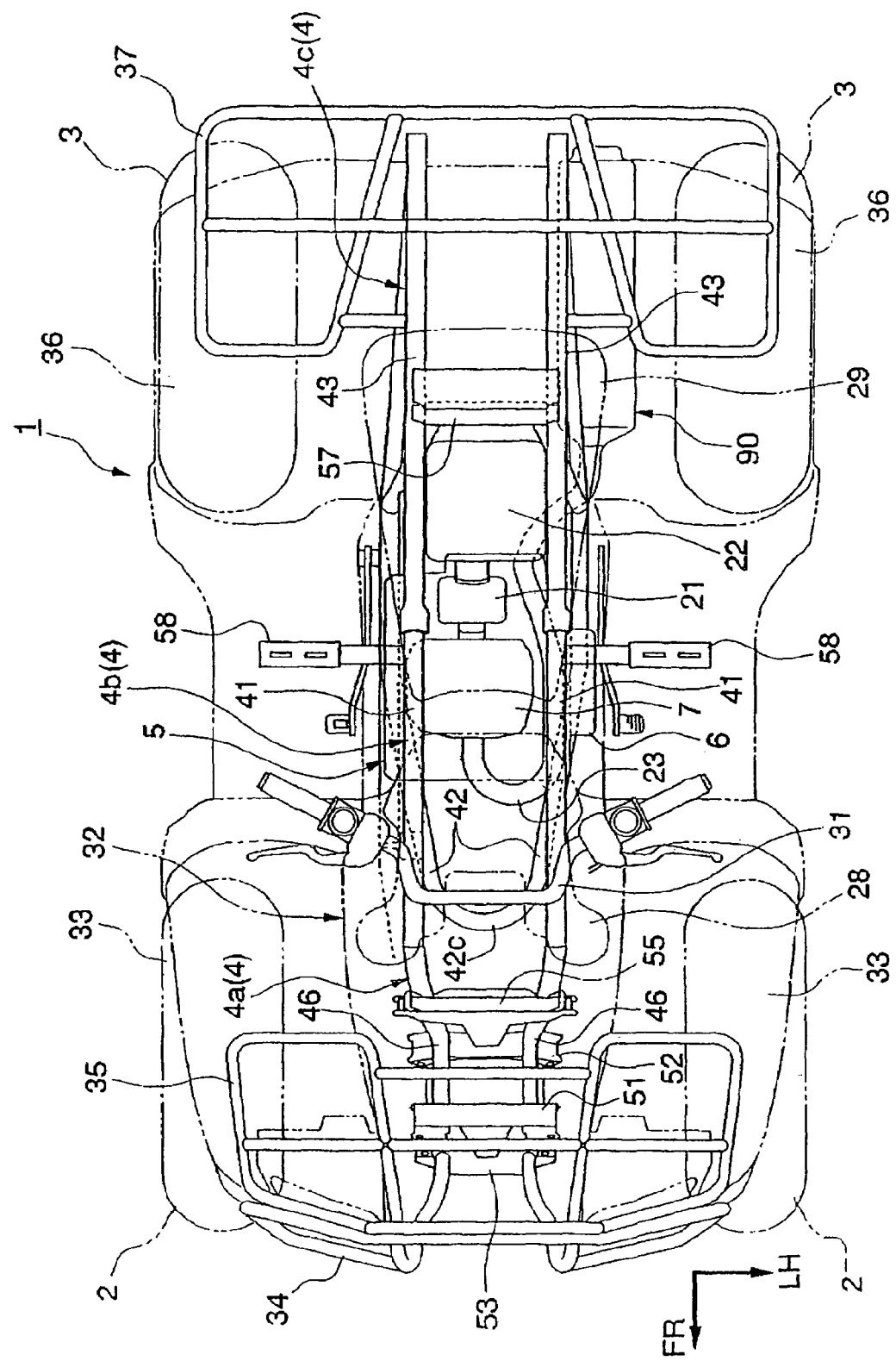
FIG. 2 is a top view of the four-wheeled buggy.

Referring to FIGS. 1 and 2, a throttle body 21 is connected to the rear portion of the cylinder unit 7 included in the engine 5. An air cleaner case 22 is connected to the rear portion of the throttle body 21. The proximal end of an exhaust pipe 23 is connected to the front portion of the cylinder unit 7. The exhaust pipe 23 extends forward of the front portion of the cylinder unit 7, returning therefrom, and further extends backward while passing the left-hand of the cylinder unit 7. Then, it is at its distal portion connected to a muffler 90, which is located at the rear portion of the vehicle body. A radiator 25 is provided for cooling the engine 5 and a fuel pump 26 is provided for supplying fuel (under pressure) to an injector (not shown).

In the widthwise middle portion of the body of the buggy 1, are arranged a steering shaft 27, a fuel tank 28, a buggy seat 29 and the like in order from the front. The lower end of the steering shaft 27 is connected to a front wheel steering mechanism (not shown) and the upper end is connected to a handlebar 31.

A resin-made body cover 32 covering the front body, a resin-made front fender 33 covering the front wheels 2 from above and toward the rear, a steel front protector 34, a steel front carrier 35, and the like are attached to the front portion of the body frame 4. A resin-made rear fender 36 covering the rear wheels 3 from above and toward the front, a rear carrier 37 made of mainly steel and the like are attached to the rear portion of the body frame 4. The muffler 90 is supported by the body frame 4 at a portion enclosed by the body frame 4, the rear fender 36, and the rear wheels 3.

Figure 3:
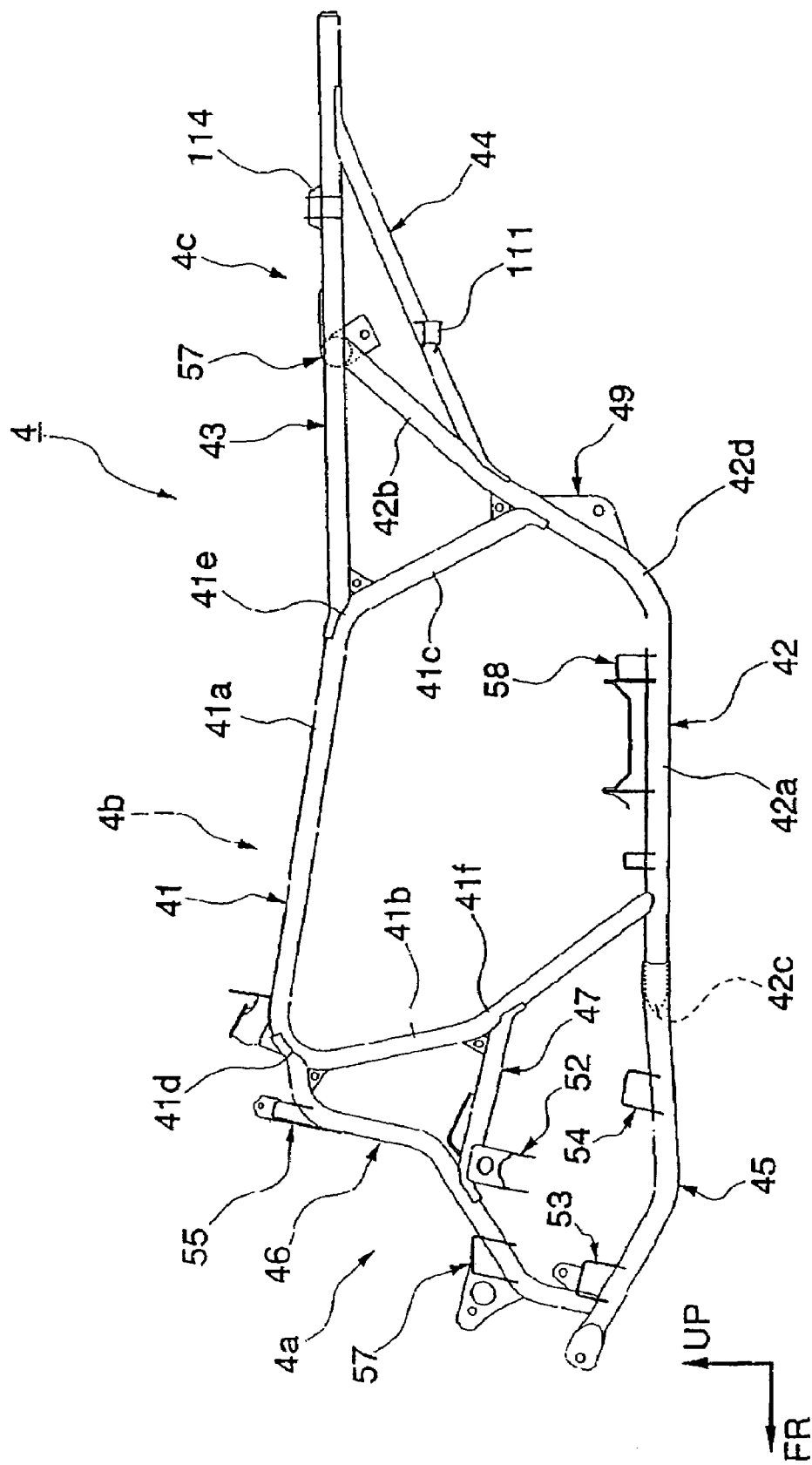
FIG. 3 is a side view of the body frame of the four-wheeled buggy.

Referring to FIG. 3 the body frame 4 is composed of a multiple kinds of steel products that are joined together by welding or the like. More specifically, an appropriate closed loop structure is made by using left and right upper pipes 41, lower pipes 42 and the like, which are then coupled to each other through a plurality of cross members. Thus, a box structure extending in the lengthwise direction is formed in the widthwise middle portion of the vehicle. Here, a portion comprising mainly the upper pipes 41 and lower pipes 42 are referred to as the center portion 4b of the body frame 4.

Each upper pipe 41 comprises an upper slant part 41a, a front slant part 41b, and a rear slant part 41c, which constitute a single steel pipe subjected to bending. The upper slant part 41a is disposed on the upper external side of the body frame 4 to slightly slant backward downwardly. The rear slant part 41b extends from the front end of the upper slant part 41a toward an obliquely backward downside so as to form an acute angle relative to the upper slant part 41a. The rear slant part 41c extends from the rear end of the upper slant part 41a toward an obliquely backward downside so as to form an obtus angle relative to the upper slant part 41a. A description will be below made referring to, in the upper pipe 41, a bent portion between the upper slant part 41a and the front slant part 41b as a front bent portion 41d, and a bent portion between the upper slant part 41a and the rear slant part 41c as a rear bent portion 41e. In addition, a description will be made referring to a bent portion projecting forward at the almost middle portion of the front slant part 41b as an intermediate bent portion 41f.

Each lower pipe 42 includes a lower horizontal part 42a and a rear slant part 42b, which constitute a single steel pipe subjected to bending. The lower horizontal part 42a is disposed to extend almost horizontally on the lower exterior side of the body frame 4. The rear slant part 42b extends from the rear end of the lower horizontal part 42a toward the oblique rear upside so as to form an obtuse angle relative to the lower horizontal part 42a. The respective front ends (front ends of the lower horizontal parts 42a) of the left and right lower pipes 42 are connected to each other through an arc-shaped part 42c (refer to FIG. 3) so that the lower pipes 42 may form an integral construction. The arc-shaped pipe 42c protrudes forward as viewed from above the vehicle. A description will be below made referring to, as a lower bent portion 42d, a bent portion between the lower horizontal part 42a and the rear slant part 42b in each lower pipe 42.

The lower end of the front slant part 41b included in each upper pipe 41 is joined to the lower horizontal part 42a of the corresponding lower pipe 42 at a location near its front end. The lower end of the rear slant part 41c of each upper pipe 41 is joined to the rear slant part 42b of the corresponding lower pipe 42 at its longitudinally almost-middle position. A pivot bracket 49 is provided on the lower rear side of the rear slant part 41c of each upper pipe 41 integrally therewith. The pivot bracket 49 is formed in a flat, approximate triangle extending in the back-and-forth direction. In addition, each pivot bracket 49 is used to support the front end of a swing arm 71 included in the corresponding rear suspension 70.

The front end of each of the left and right rear upper pipes 43 is joined to the rear bent portion 41e of the corresponding upper pipe 41. The rear upper pipes 43 are arranged as seat rails to extend substantially horizontally. The upper end of the rear slant part 42b included in the lower pipe 42 is joined to the longitudinally almost-middle portion of the corresponding rear upper pipe 43. A rear sub-pipe 44 extends to slant backward and upward from the longitudinally almost-middle portion of the rear slant part 42b included in the corresponding lower pipe 42 to the rear end of the associated rear pipe 43. A portion composed mainly of the rear pipes 43 and the rear sub-pipes 44 are referred to as the rear portion 4c of the body frame 4. A cross member spanned between the longitudinally almost-middle portions of the left and right rear upper pipes 43 is referred to as a rear cross pipe 57.

Each of the rear ends of the left and right front lower pipes 45 arranged to extend substantially horizontally is joined to the lower horizontal part 42a of the corresponding lower pipe 42 at a location near the front end thereof. Each front lower pipe 45 bends toward the oblique upside and front, as viewed from the side of the vehicle, at a position near the axle of each front wheel 2. In addition, the front end of the front lower pipe 45 carries the lower end of the front protector 34. Incidentally, reference numeral 58 denotes operator's foot steps. The foot steps 58 are provided with respective step boards 58a, which extend between the front fender 33 and the rear fender 36.

Left and right front cushion pipes 46 extend from the front bent portions 41d of the upper pipes 41 to near the front ends of the front lower pipes 45, respectively. Specifically, each of the upper ends of the front cushion pipes 46 is joined to the corresponding front bent portion 41d. Each front cushion pipe 46 extends a little forwardly from the upper bent portion 41d of the corresponding upper pipe 41, and bends toward the oblique front and downside. In addition, it bends in a moderate crank shape such that its lower portion is located forwardly of its upper portion. The lower end of the front cushion pipe 46 is joined to the corresponding front lower pipe 45 at a position near the front end thereof. Left and right front sub-pipes 47 are each spanned between the vertically almost-middle portion of each cushion pipe 46 and the intermediate bent portion 41f of the corresponding upper pipe 41 so as to slant slightly forwardly and upwardly.

An intermediate front cross beam 51 and an upper center cross beam 55, both extending laterally, are spanned between the left and right front cushion pipes 46. Likewise, a lower front cross beam 53 and a lower rear cross beam 54 are each spanned between the left and right front lower pipes 45. In addition, an intermediate rear cross beam 52 is spanned between the left and right front sub-pipes 47. Here, a portion composed mainly of the front lower pipes 45, the front cushion pipes 46, the front sub-pipes 47 and the cross beams 51 to 55 is referred to as the front portion 4a of the body frame 4.

The front suspension 60 is carried by the front portion 4a of the body frame 4 and formed as the so-called double wishbone type suspension. More specifically, the front suspension 60 is mainly composed of: left and right upper and lower arms (not shown) whose respective proximal ends are supported vertically swingably by the body frame 4; left and right knuckles (not shown) supported by the corresponding distal ends of the arms; and left and right front cushion units 64 each interposed between the corresponding arm and the body frame 4. Incidentally, the cross beams 51 to 54 are provided on both sides thereof with respective arm connecting portions 51a to 54a supporting the corresponding proximal ends of each of the arms.

A rear suspension 70 suspending each rear wheel 3 is mainly composed of a swing arm 71 and a rear cushion unit 72. The swing arm 71 has a front end which is vertically swingably supported by each pivot bracket 49 and a rear end which rotatably supports a rear axle shaft 16 extending to each rear wheel 3. The rear cushion unit 72 has a lower end which is located at the widthwise almost-middle position of the body and is connected to the swing arm 71 at a position near the rear end thereof. In addition, the rear cushion unit 72 is connected at its upper end to the rear cross pipe 57 of the body frame 4.

Figure 4:
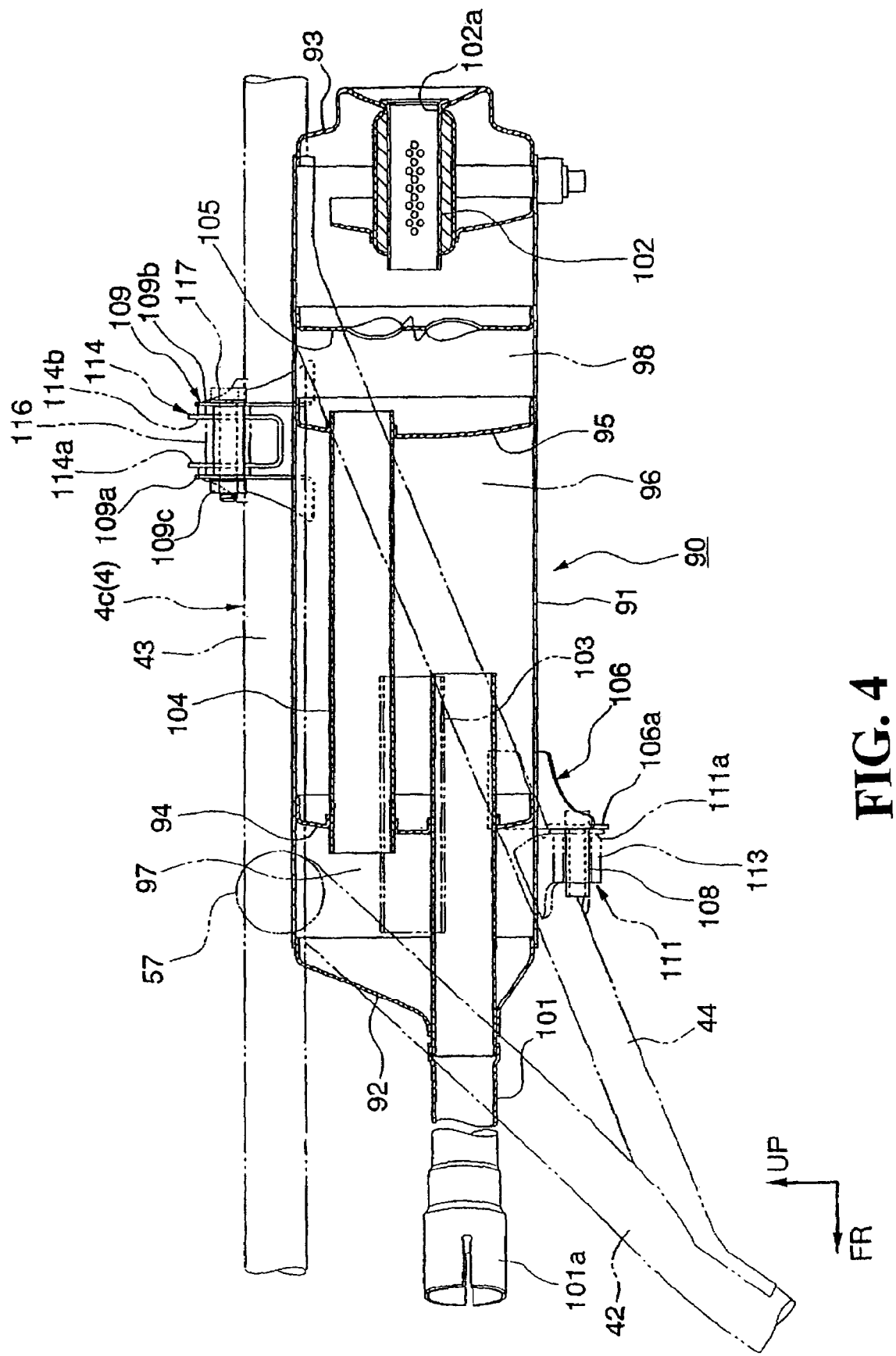
FIG. 4 is a side view of a muffler and its vicinity of the four-wheeled buggy.
Figure 5:
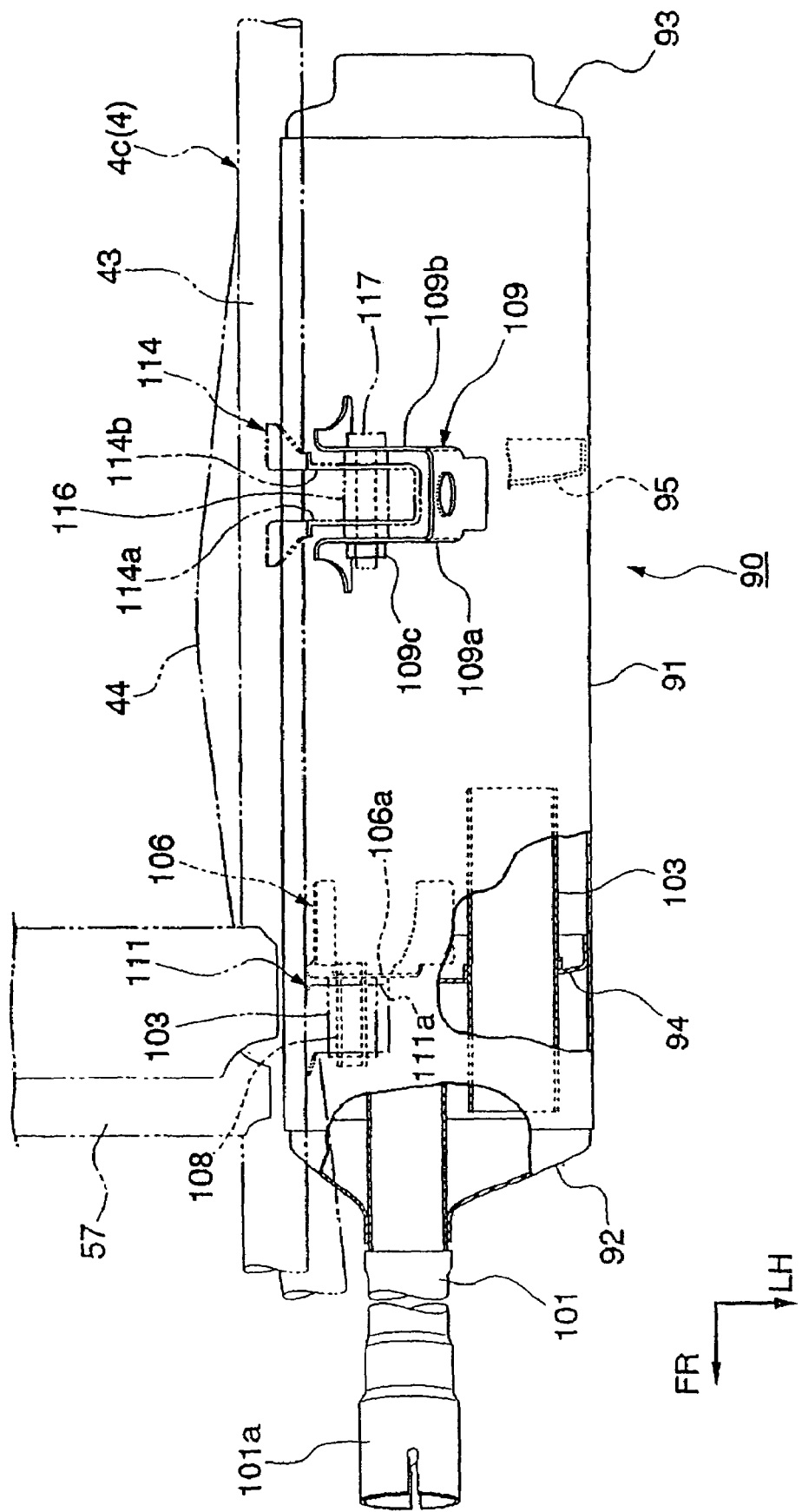
FIG. 5 is a top view of the muffler and its vicinity of the four-wheeled buggy.

Referring to FIGS. 4 and 5, the muffler 90 is of a cylindrical shape extending substantially in the lengthwise direction. It includes an external cylinder 91 forming the outer wall, a front cap 92 and an end cap 93 provided respectively at the front and rear ends of the outer cylinder 91, and a front barrier rib 94 and a rear barrier rib 95 which divide the space within the outer cylinder into three expansion chambers in the axial direction thereof. A description will be below be made by referring to an interspace between the front barrier rib 94 and the rear barrier rib 95 as a first expansion chamber 96, an interspace between the front cap 92 and the front barrier rib 94 as a second expansion chamber 97, and an interspace between the rear barrier rib 95 and the end cap 93 as a third expansion chamber 98.

An exhaust intake pipe 101 passing axially through the front cap 92 and the front barrier rib 94 is provided in the front portion of the muffler 90. An exhaust discharge pipe 102 passing axially through the end cap 93 is provided in the rear portion of the muffler 90. The exhaust intake pipe 101 extends forward from the muffler front end to form a connection part 101a connecting with the rear end of the exhaust pipe 23. The exhaust discharge pipe 102 has an exhaust outlet 102a formed at the muffler rear end. Further, a first communication pipe 103 passing axially through the front barrier rib 94 and a second communication pipe 104 passing axially through the front barrier rib 94 and the rear barrier rib 95 are provided in the muffler 90.

Thus, the expansion chambers communicate with one another through the communication pipes 103, 104. More specifically, exhaust gas introduced into the muffler through the exhaust intake pipe 101 first flows in the first expansion chamber 96, and passes through the first communication pipe 103 into the second expansion chamber 97. Then, it passes through the second communication pipe 104 into the third expansion chamber 98, and finally discharged through the exhaust discharge pipe 102 to the outside of the muffler. In this way, high temperature high pressure exhaust gas introduced into the muffler is cooled and reduced in pressure during the process of passing through the multiple expansion chambers 96, 97, 98. This effectively reduces exhaust noise. Incidentally, reference numeral 105 in the figure denotes a spark arrestor for suppressing fire coming from the exhaust outlet 102a.

A front lower stay 106 and a rear upper stay 109 are provided on the outer circumference of the muffler 90. Both the stays 106, 109 serve as attachment portions used when the muffler 90 is supported by the body frame 4. The front lower stay 106 includes a front wall part 106a extending in a direction perpendicular to the lengthwise direction and a hollow retaining pin (retaining part) 108 attached to the front wall part 106a so as to project forwardly. The upper end of the front lower stay 106 is attached (e.g. welded) to an outer circumferential portion of the muffler 90 opposite with the portion to which the front barrier rib 94 is secured, so as to project downward therefrom. In this case, the retaining pin 108 is located at a position spaced a certain distance apart from the outer cylinder 91, and extends parallel to the muffler 90, that is, along the lengthwise direction.

A front support bracket 111 associated with such a front lower stay 106 is attached to each rear sub-pipe 44 of the body frame. The front support bracket 111 is formed with a rear wall part 11a opposite to the front wall part 106a of the front lower stay 106. The front support bracket 111 holds a pin insertion member 113 through which the retaining pin 108 can be inserted. The inside portion of the front support bracket 111 is welded to the outside portion of the rear sub-pipe 44 in such a manner that the front support bracket 111 projects outward from the rear sub-pipe 44.

The pin insertion member 113 is of a cylindrical shape extending in the lengthwise direction and is disposed at a position spaced a certain distance apart from the rear sub-pipe 44. The pin insertion member 113 is made of an elastic material such as EPDM (ethylene propylene rubber). The pin insertion member 113 can hold the retaining pin 108 of the front lower stay 106 passing therethrough in the lengthwise direction.

On the other hand, the rear upper stay 109 includes a front wall part 109a and a rear wall part 109b, both extending in a direction perpendicular to the lengthwise direction. The lower end of the rear upper stay 109 is attached (e.g. welded) to a circumferential portion of the muffler 90 opposite the portion to which the rear barrier rib 95 is secured, so as to project upward therefrom. The front and rear wall parts 109a, 109b of the rear upper stay 109 are each formed with a bolt-hole, into which the shaft of a bolt (fastener) 117 for supporting the muffler is inserted. In addition, a nut 109c to be engaged threadedly with the bolt 117 is attached (e.g. welded) to the front side of the front wall part 109a.

A rear support bracket 114 associated with such a rear upper stay 109 is attached to each rear upper pipe 43 of the body frame 4. The rear support bracket 114 is provided so as to be interposed between the front and rear wall parts 109a, 109b of the rear upper stay 109. In addition, the rear support bracket 114 holds a bolt insertion member 116 into which the shaft of a bolt 117 can be inserted. The inside portion of the rear support bracket 114 is joined to the outside portion of the rear upper pipe 43 so that the rear support bracket 114 projects outward and laterally from the rear upper pipe 43. Further, the rear support bracket 114 is formed with a front wall part 114a and a rear wall part 114b facing the front wall part 109a and the rear wall part 109b, respectively, of the rear upper stay 109.

The bolt insertion member 116 is of a cylindrical shape extending in the lengthwise direction. It is disposed at a position spaced a certain distance apart from the rear upper pipe 43 so as to be concentric with each bolt-hole of the front and rear wall parts 109a, 109b of the rear upper stay 109. As with the pin insertion member 113, the bolt insertion member 116 is made of an elastic member such as EPDM (ethylene propylene rubber). The bolt insertion member 116 can hold the bolt 117 whose shaft is inserted thereinto in the lengthwise direction.

When the muffler 90 is mounted to the body frame 4, it is first subjected to a trail fitting to the body frame 4. More specifically, the rear end of the exhaust pipe 23 is inserted into the connection part 101a of the exhaust intake pipe 101 while the muffler 90 is moved from rearward of the body toward the forward. At the same time, the retaining pin 108 of the front lower stay 106 is inserted into the pin insertion member 113 of the front support bracket 111. In such a state, the front wall part 106a of the front lower stay 106 is designed to be in contact with the rear wall part 11a of the front support bracket 111. This restricts the posterior-anterior position of the muffler 90, so that the muffler 90 can be temporarily fitted to the body frame 4 with ease.

Then, the rear support bracket 114 is brought into a position between the front and rear wall parts of the rear upper stay 109. The shaft of the bolt 117 is entirely inserted into the rear support bracket 114 and the front and rear wall parts of the rear upper stay 109 from the rear of the vehicle. The shaft is threadedly engaged with the nut 109c attached to the rear upper stay 109. Thus, the rear upper stay 109 is connected to the rear support bracket 114 through the bolt 117 and the bolt insertion member 116. In this state, the front lower portion of the muffler 90 is carried by the body frame 4 through the retaining pin 108 and the pin insertion member 113 whereas the rear upper portion of the muffler 90 is carried by the body frame 4 through the bolt 117 and the bolt insertion member 116.

As described above, the muffler mounting structure of the embodiment is such that the muffler 90 is supported inside the rear wheels 3 by the body frame 4. More specifically, the muffler 90 is fastened to the body frame 4 through the bolt 117 screwed in the lengthwise direction of and in a manner parallel to the body.

With this configuration, it is possible to insert a tool from a portion, rearward of the muffler 90, being usually open, and allow it to more easily access the bolt 117 adapted to connect the muffler 90 to the body frame 4. In other words, the muffler 90 can be easily mounted and dismounted without the obstacle of the body frame 4 and the rear wheels 3.

The muffler mounting structure is such that the front lower stay 106 and the rear upper stay 109 are mounted on the upper and lower portions, respectively, of the muffler 90, the rear upper stay 109 is connected to the body frame 4 through the bolt 117, and the front lower stay 106 is engaged with the body frame 4 with the retaining pin 108.

With this configuration, since the front lower stay 106 with the retaining pin 108 is only engaged with and disengaged from the body frame 4 whereas only the rear upper stay 109 is fastened or unfastened with the bolt 117, the muffler 90 can be mounted and dismounted in this way. This makes it possible to further facilitate the attaching and detaching operation of the muffler 90. In addition, since the muffler 90 is carried at its multiple positions by the body frame 4, the mounting rigidity of the muffler 90 can be enhanced.

Since the rear upper stay 109 connected to the body frame 4 through the bolt 117 is mounted to the rear portion of the muffler 90, when a tool is inserted from the rear of the muffler 90 for work, it is easy for the tool to access the bolt 117 and the working circumstances can be checked with more ease. Thus, the muffler 90 can be attached and detached more easily.

Further, since it is at a single location that the rear upper stay 109 is connected to the body frame 4 through the bolt 117, fastening man-hours for attaching and detaching the muffler 90 can be reduced.

With the muffler mounting configuration, the stays 106, 109 are attached to the outer circumferential portions opposed with the barrier ribs 94, 95, respectively, within the muffler 90. This makes it possible to carry the muffler 90 at the respective portions reinforced with the barrier ribs 94, 95. Thus, the supporting rigidity of the muffler 90 can be further improved.

Incidentally, the present invention is not limited to the embodiment described above. For instance, the muffler 90 may be carried by the body frame 4 at a single location or at three or more attachment locations. Another configuration may be adopted wherein a bolt is attached to the body frame 4, and a nut is screwed on the bolt, whereby the muffler 90 is connected to the body frame 4. Yet another configuration may be adopted in which a hook-like member in place of the retaining pin 108 is attached to the body frame 4.

The configuration of the embodiment is just an example and not limited to the application to the four-wheeled buggy. As a matter of course, various changes or modifications may be made unless they depart from the spirit of the invention.

We claim:

1. A muffler mounting structure for a vehicle having two rear wheels, comprising:
   a muffler supported by a vehicle body frame at a location enclosed by the vehicle body frame, one of said rear wheels, and a rear fender that covers a front and a top portion of said rear wheel, and
   a bolt for mounting said muffler to said vehicle body frame, wherein said bolt is attached substantially parallel to a lengthwise direction of the vehicle body, wherein
   the muffler is disposed between said rear wheel and the vehicle body frame, when viewed from the top direction,
   said muffler includes a plurality of attachment portions, at least one each disposed respectively on an upper portion and a lower portion of said muffler,
   at least one of said attachment portions is attached to the vehicle body frame through said bolt, and another of said attachment portions is attached to the vehicle body frame through a retaining pin extending toward a front of the vehicle,
   the attachment portion fastened to the body frame through said bolt is located on a rear outer circumferential portion of the muffler, respective to a rear side of the vehicle, and
   the attachment portion attached to the vehicle body frame through a retaining pin is located on a front outer circumferential portion of the muffler, respective to a rear side of the vehicle, and
   an area rearward of the muffler is open.

2. The muffler mounting structure according to claim 1, wherein the attachment portion fastened to the body frame through the bolt is located at a single position.

3. The muffler mounting structure according to claim 1, wherein
   the muffler is formed in a generally cylindrical shape and extends substantially in the back-and-forth direction,
   the muffler includes an outer cylinder forming an outer wall, a front cap and an end cap provided respectively at a front and rear end of the external cylinder, and a front barrier rib and a rear barrier rib which divide an interior of the outer cylinder into three expansion chambers in an axial direction thereof,
   the attachment portion located on the front portion of the muffler is mounted at a position on the outer cylinder of the muffler so as to correspond to the front barrier rib, and the attachment portion located on the rear portion of the muffler is mounted at a position on the outer cylinder of the muffler so as to correspond to the rear barrier rib.

4. The muffler mounting structure according to claim 1, wherein said vehicle is a four-wheeled all-terrain vehicle.

5. The muffler mounting structure according to claim 1, further comprising:
   a front lower stay provided at a location on the outer circumference of the muffler so as to correspond to the front barrier rib;
   a front support bracket is attached to and projects outward from the vehicle body frame, wherein the front lower stay includes a rear wall part and a front wall part,
the front wall part extends in a direction perpendicular to the back-and-forth direction.
the retaining pin is attached to the front wall part and projects forwardly,
the front support bracket holds a pin insertion member,
the pin insertion member is positioned apart from the vehicle body frame, and
the pin insertion member holds the retaining pin such that the retaining pin is moveable in the lengthwise direction of the vehicle.

* * * * *